Figure 1:
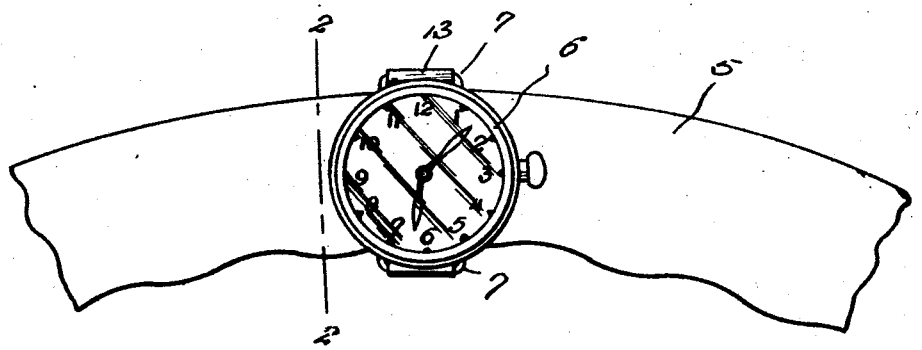

Nov. 3, 1925.  
S. W. FRENCH  
1,559,952

WATCH HOLDER FOR VEHICLE STEERING WHEELS

Filed Jan. 26, 1924

S. W. French,
INVENTOR.

BY
ATTORNEYS.

Patented Nov. 3, 1925.

1,559,952

UNITED STATES PATENT OFFICE.

SANFORD W. FRENCH, OF FORT BLISS, TEXAS.

WATCH HOLDER FOR VEHICLE STEERING WHEELS.

Application filed January 26, 1924. Serial No. 688,742.

*To all whom it may concern:*

Be it known that I, SANFORD W. FRENCH, citizen of the United States of America, residing at Fort Bliss, in the county of El Paso and State of Texas, have invented certain new and useful Improvements in Watch Holders for Vehicle Steering Wheels, of which the following is a specification.

This invention relates to an improvement in watch holders and has more specific reference to a holder that is primarily intended for the attachment of a watch to the steering wheel of a motor vehicle in order that the same may be readily viewed at all times by the operator of the vehicle.

The primary object of the invention resides in the provision of such a holder that may be applied to or removed from the steering wheel without any great difficulty and one that may be associated with practically all types of steering wheels now employed in conjunction with motor vehicles.

With the foregoing and other objects in view as the nature of the invention will be better understood, the same comprises a novel form of a steering wheel watch holder hereinafter more fully described, shown in the accompanying drawing, and claimed.

Figure 2:
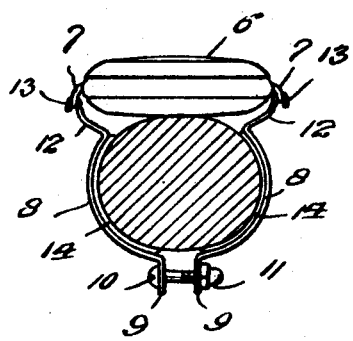

In the drawing wherein like reference characters indicate corresponding parts throughout both of the views:

Figure 1 is a fragmentary elevational view of a vehicle steering wheel to which there is attached a watch through the medium of the present holder, and Figure 2 is a sectional view taken substantially upon the line 2—2 of Figure 1, or disclosing in side elevation the watch holder constructed in accordance with the present invention.

Now having particular reference to the drawing, 5 indicates a conventional type of vehicle steering wheel, and 6 a suitable form of watch, the casing of which is provided at diametrically opposite points with laterally extending downturned metal loop members 7—7.

The present holder includes a pair of curvilinear metal jaw members 8—8 of such a curvature as to closely fit the inner and outer edges of the steering wheel 5, as more clearly shown in Figure 2. The innermost ends of these jaws 8—8 are formed with lateral ears 9—9 that are in turn formed with registering openings for the reception of a bolt 10 upon the threaded end of which is to be engaged a nut 11.

The upper opposite ends of said jaws 8—8 are curved outwardly as at 12—12 and then are reversely bent downwardly as to provide hooks 13—13 and previous to the engagement of the bolt 10 to the openings in the ears 9—9, said hooks 13—13 are passed through the loop members 7—7 of the casing of the watch 6.

For preventing scratching or other marring of the steering wheel by the jaw members 8—8, strips of felt or other suitable material 14—14 are positioned between said jaws 8—8 and the adjacent portions of the steering wheel 5.

From the foregoing, it will at once be apparent that I have provided a highly novel and useful form of watch holder for vehicle steering wheels, and one that will meet with all of the requirements for a successful commercial use.

Minor changes may be made in the invention without departing from the spirit and scope of the appended claim.

Having thus described my invention, what I claim as new and desire to secure by Letters Patent is:

In combination with a watch case, provided at diametrically opposite sides with loops, a holder comprising a pair of metallic strips of the same configuration and dimension, each strip being provided at one end with a hook portion adapted to partially engage around the intermediate portion of one of the loops, each hook portion having an angularly disposed shank portion adapted to lie under the edge portion of the case, each shank portion merging with an arcuate portion to form a re-entrant angle therewith, and each arcuate portion merging into an outstanding ear formed at the opposite end of the strip from that end at which the hooked portion is located, and a draw bolt passing transversely through the ears and adapted to draw the arcuate portions of the strips and the side of the watch case toward the peripheral surface of a support.

In testimony whereof affix signature.

SANFORD W. FRENCH.